(12) United States Patent
Borghi et al.

(10) Patent No.: US 10,042,432 B2
(45) Date of Patent: Aug. 7, 2018

(54) PROGRAMMABLE ONBOARD INTERFACE

(71) Applicant: Faraday&Future Inc., Gardena, CA (US)

(72) Inventors: Cory D. Borghi, Torrance, CA (US); Pei Chen, Torrance, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/281,487

(22) Filed: Sep. 30, 2016

(65) Prior Publication Data

US 2017/0090594 A1    Mar. 30, 2017

Related U.S. Application Data

(60) Provisional application No. 62/234,930, filed on Sep. 30, 2015.

(51) Int. Cl.
*G06F 3/02* (2006.01)
*G01C 21/36* (2006.01)
*G06F 3/0354* (2013.01)

(52) U.S. Cl.
CPC ....... *G06F 3/0202* (2013.01); *G01C 21/3664* (2013.01); *G06F 3/03547* (2013.01); *G06F 3/03549* (2013.01)

(58) Field of Classification Search
None
See application file for complete search history.

(56) References Cited

U.S. PATENT DOCUMENTS

| 4,738,417 | A | * | 4/1988 | Wenger | B62D 1/12 |
| | | | | | 244/234 |
| 2005/0203684 | A1 | * | 9/2005 | Borgesson | B60K 35/00 |
| | | | | | 701/36 |
| 2011/0257810 | A1 | | 10/2011 | Leger | |
| 2014/0229060 | A1 | * | 8/2014 | MacNeille | G06F 17/00 |
| | | | | | 701/36 |

* cited by examiner

*Primary Examiner* — Mussa A Shaawat
*Assistant Examiner* — Kyung J Kim
(74) *Attorney, Agent, or Firm* — Lee & Hayes PLLC

(57) ABSTRACT

A vehicle may include a first seat configured to accommodate an occupant and an onboard interface device adjacent to the first seat. The onboard interface device may include a housing configured to accommodate a palm of the occupant, a first groove positioned in the housing and configured to accommodate a first finger of the occupant, and a first input device positioned in the first groove and configured to be actuated by the first finger and generate a first signal for controlling a first operation of the vehicle.

19 Claims, 6 Drawing Sheets

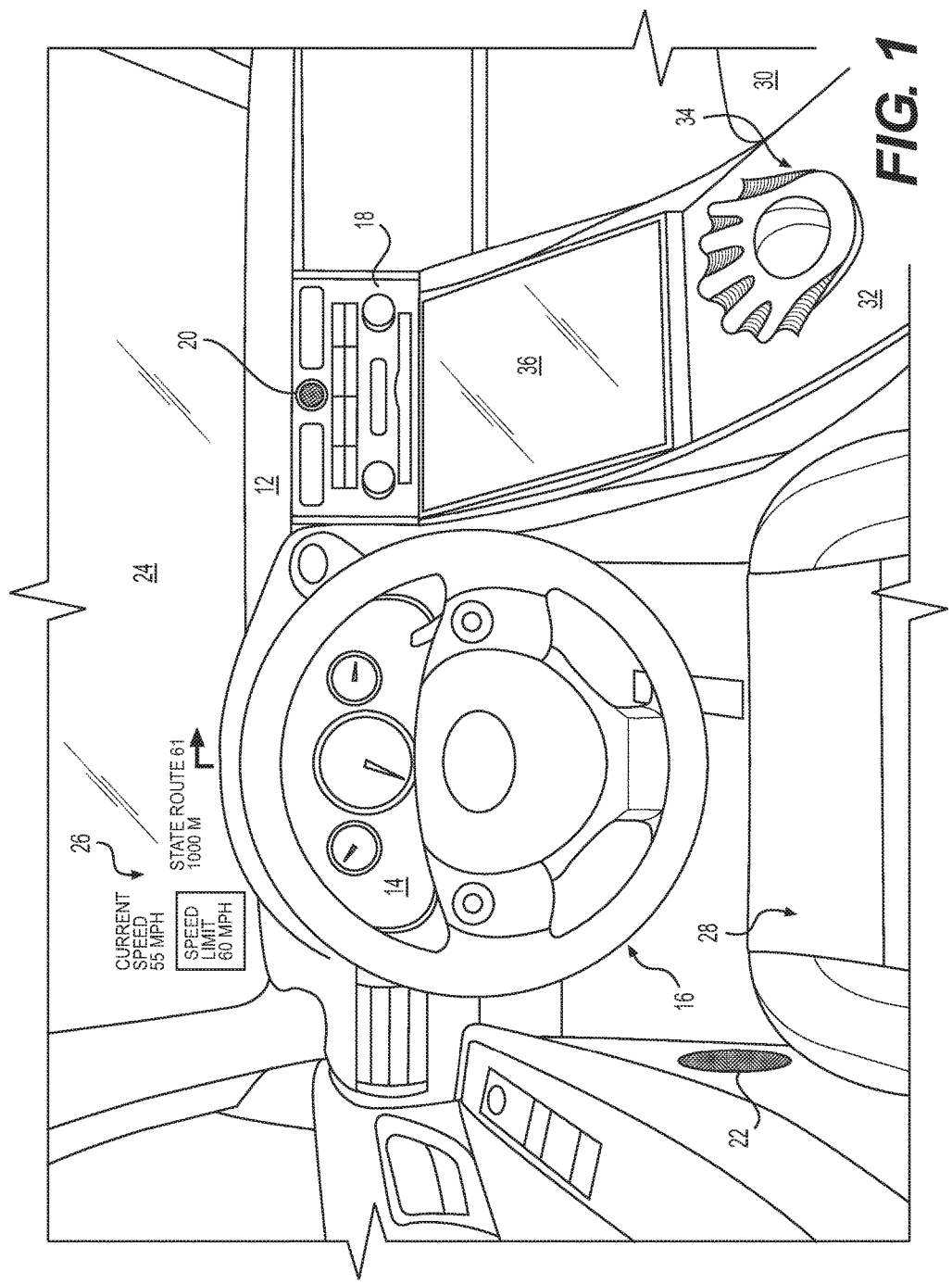

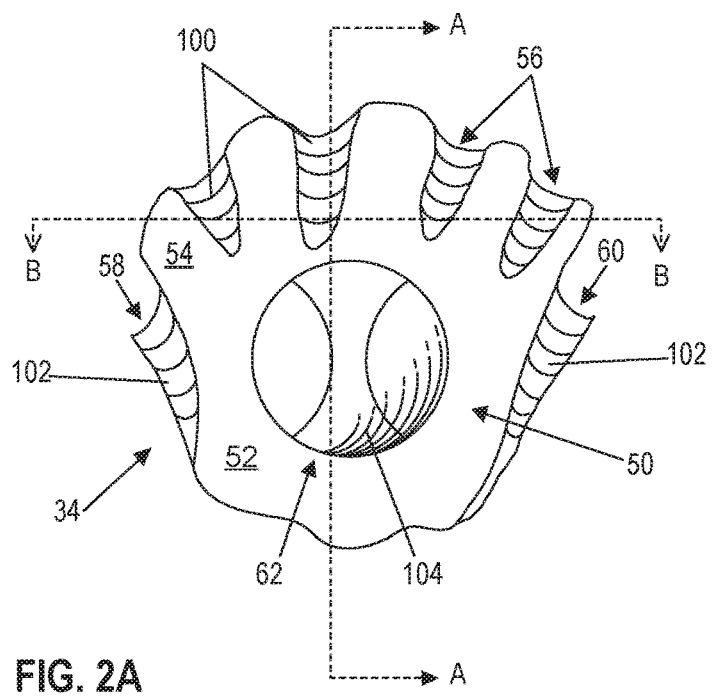
FIG. 2A
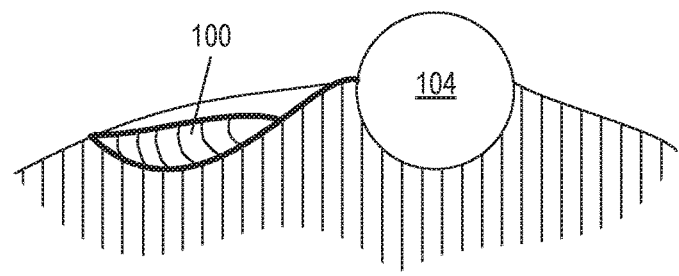
FIG. 2B  A - A
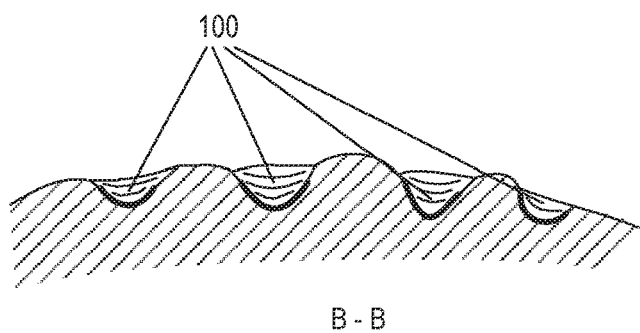
B - B
FIG. 2C

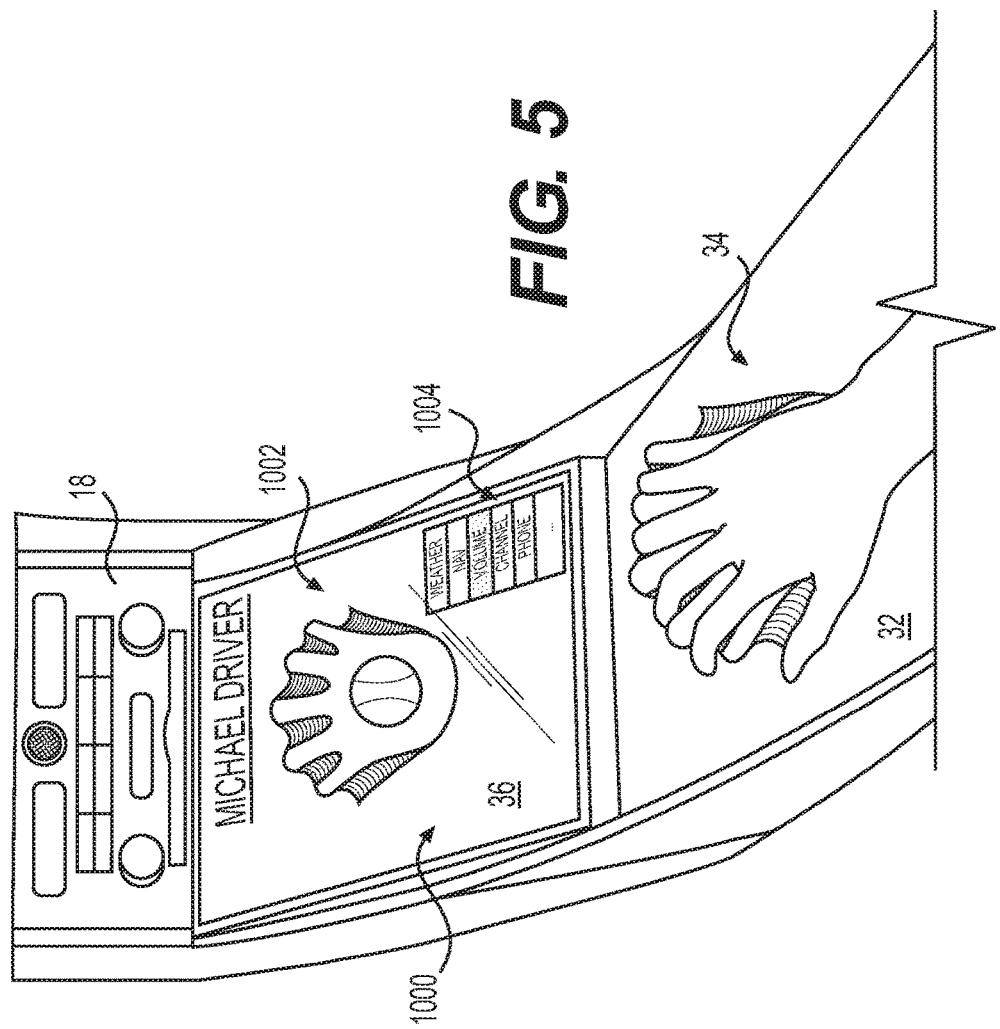

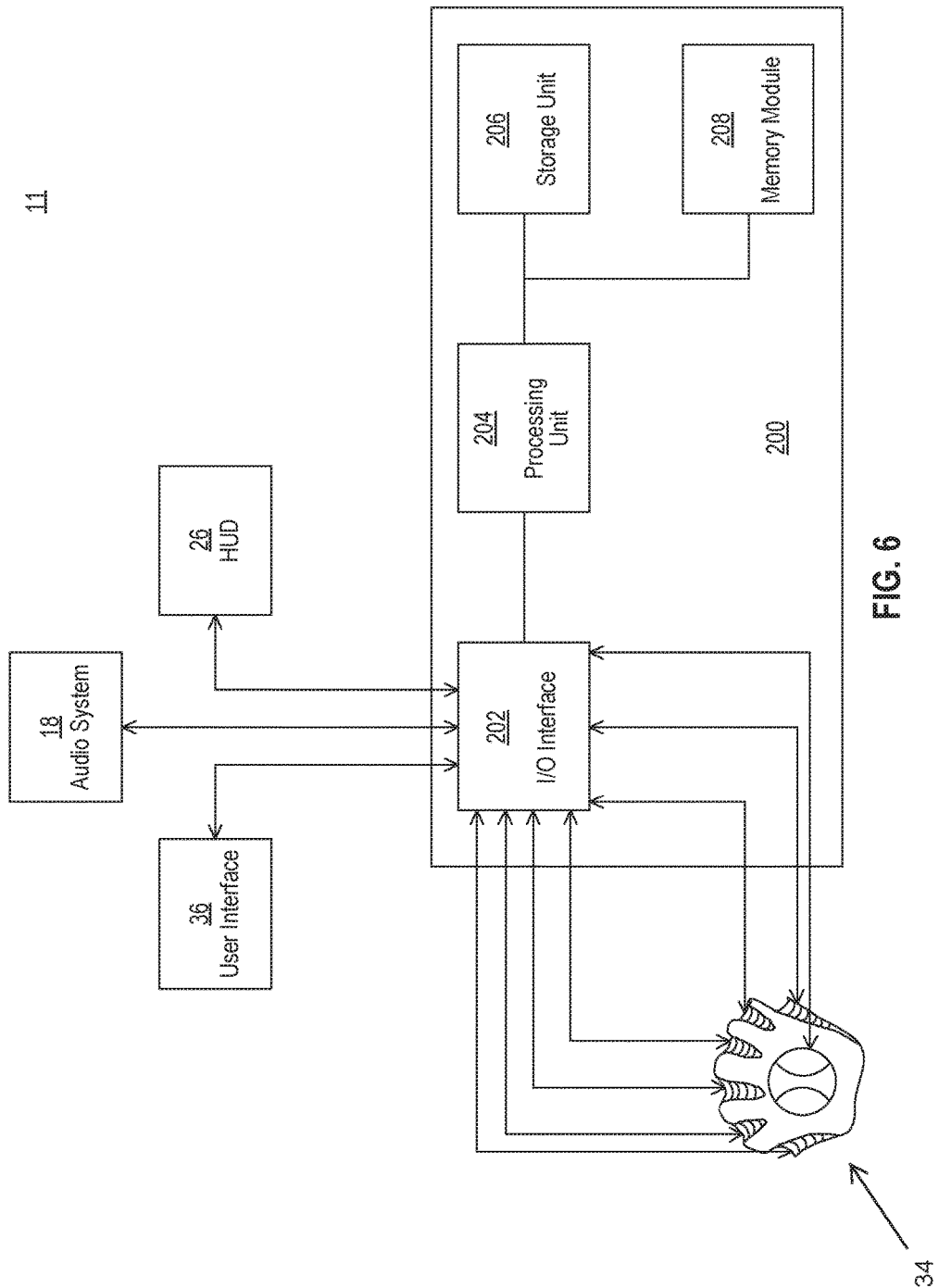

PROGRAMMABLE ONBOARD INTERFACE

CROSS REFERENCE TO RELATED APPLICATIONS

This application is based on and claims the benefit of priority based on U.S. Provisional Patent Application No. 62/234,930 filed on Sep. 30, 2015, the entire disclosure of which is incorporated by reference.

TECHNICAL FIELD

The present disclosure relates generally to a system for controlling a vehicle and, more particularly, to a programmable onboard interface for controlling a vehicle.

BACKGROUND

Existing user interface devices onboard vehicles typically have either a touch screen that displays a user interface or a panel including buttons and knobs for user interaction. These existing onboard user interface devices, however, may not be easy to use or accurately capture the desired user input. For example, touch screens are often too detailed and unresponsive making it difficult to determine whether a user pressed an icon or a desired portion of an image (e.g., a map) rendered on the screen without looking at the screen. Similarly, buttons and turning knobs on a panel may also not allow a user to determine whether he/she makes the desired selection without looking at the panel.

As a result, a driver may have to move his/her attention away from the road when using the onboard user interface devices. Even a distraction like this may cause substantial risks and significantly increase the probability of an accident. Therefore, it is beneficial to have an onboard user interface device that is programmable and accurately captures user inputs so that the driver or another vehicle occupant does not have to look at the device in order to make the desired selection or operation. It is also desired to simplify the operation of the touch screen or interface panel so that the user does not have to navigate a complicated menu system during operation of the vehicle.

The programmable onboard interface of the present disclosure may mitigate or solve one or more of the problems set forth above and/or other problems in the art.

SUMMARY

One aspect of the present disclosure is directed to a vehicle. The vehicle may include a first seat configured to accommodate an occupant and an onboard interface device adjacent to the first seat. The onboard interface device may include a housing configured to accommodate a palm of the occupant, a first groove positioned in the housing and configured to accommodate a first finger of the occupant, and a first input device positioned in the first groove and configured to be actuated by the first finger and generate a first signal for controlling a first operation of the vehicle.

Another aspect of the present disclosure is directed to a control system for a vehicle. The control system may include an onboard interface device that may have a housing configured to accommodate a palm of an occupant, a first groove positioned in the housing and configured to accommodate a first finger of the occupant, and a first input device positioned in the groove and configured to generate a first signal upon receiving a user input. The control system may also include a controller configured to receive the first signal from the onboard interface device and control an operation of the vehicle.

Yet another aspect of the present disclosure is directed to an onboard interface device for a vehicle. The onboard interface device may include a housing configured to accommodate a palm of an occupant, a first groove positioned in the housing and configured to accommodate a first finger of the occupant, and a first input device positioned in the first groove and configured to generate a first signal upon a first finger input for controlling a first operation of the vehicle.

BRIEF DESCRIPTION OF THE DRAWINGS

FIG. 1 is a diagrammatic illustration of an exemplary embodiment of an interior of an exemplary vehicle;

FIGS. 2A-2C are diagrammatic illustrations of an exemplary programmable onboard interface of the exemplary vehicle of FIG. 1, according to an exemplary embodiment of the disclosure;

FIG. 5 is a diagrammatic illustration of an exemplary method of programming an exemplary embodiment of the programmable onboard interface, according to an exemplary embodiment of the disclosure; and FIG. 6 is a block diagram of an exemplary embodiment of a control system operating in connection with an exemplary programmable onboard interface of the exemplary vehicle of FIG. 1, according to an exemplary embodiment of the disclosure.

DETAILED DESCRIPTION

Figure 3A:
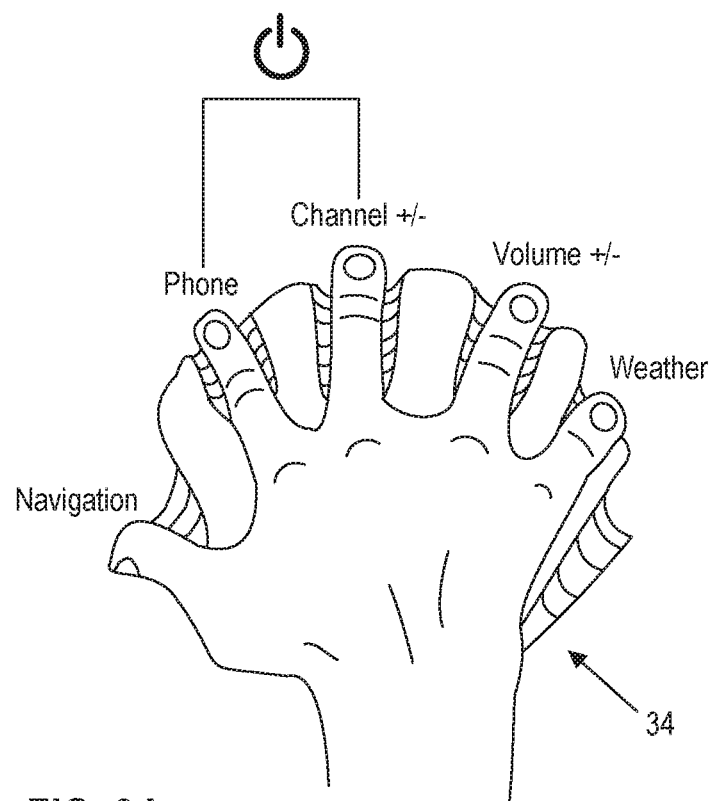
FIGS. 3A and 3B are additional diagrammatic illustrations of an exemplary programmable onboard interface of FIG. 2A, according to an exemplary embodiment of the disclosure.

The disclosure is generally directed to a control system including a programmable onboard interface (POI). The POI may be in the form of a puck and may include one or more of the following features. The POI may include shapes that generally follow the contour or shape of a hand of a user. The POI may include features (e.g., grooves) that accommodate fingers of the user, so that one or more fingers of the user are accommodated by individual features. The POI may be programmable so that each feature may be associated with one or more selected control functions for operating the vehicle. The POI may include a touch sensor/pad within each feature that provides haptic feedback so that an occupant (e.g., a driver or a passenger of the vehicle) may confirm the selection. The POI may also include a track ball/pad on which the palm of the occupant may rest. The track pad/ball may allow additional user input for making user selection or assisting the occupants to navigate through a menu system. The programming of the POI may be performed through an onboard touchscreen system configured to display an image of the POI for user programming.

Compared with conventional interface systems, the POI system may allow occupants to easily access and select control functions that are associated with the individual features of the POI using individual fingers. Because each feature may receive an input from a corresponding finger of the driver, the driver may make a desired selection of the control functions by moving a corresponding finger without having to look away from the road or being distracted from driving.

FIG. 1 provides a diagrammatic illustration of an exemplary embodiment of an interior of an exemplary vehicle 10. Vehicle 10 may have any body style, such as a sports car, a coupe, a sedan, a pick-up truck, a station wagon, a sports utility vehicle (SUV), a minivan, or a conversion van. Vehicle 10 may be an electric vehicle, a fuel cell vehicle, a hybrid vehicle or a conventional internal combustion engine vehicle. Vehicle 10 may be configured to be operated by a driver occupying vehicle 10, remotely controlled, and/or autonomous. As illustrated in FIG. 1, vehicle 10 may have a dashboard 12 that may house or support an instrument panel 14, a steering wheel 16, an audio system 18, a microphone 20, and a speaker 22. Vehicle 10 may also have a windshield 24 onto which a head-up display (HUD) 26 may be projected. Vehicle 10 may further have a driver seat 28 and a passenger seat 30 configured to accommodate occupants and separated by a center console 32. Center console 32 may include a programmable onboard interface (POI) 34 and a user interface 36.

Microphone 20 may include any structure configured to capture audio and generate audio signals of interior of vehicle 10. As depicted in FIG. 1, microphone 20 may be centrally located on dashboard 12 to capture audio and may be configured to capture voice commands from the driver in order to control functions of vehicle 10. Microphone 20 may also allow occupants to respond to messages that they receive in vehicle 10. For example, microphone 20 may be configured to transmit audio for phone calls initiated through HUD 26 or user interface 36. Microphone 20 may also be configured to capture audio signals which may be transcribed into text messages or emails.

HUD 26 may be pre-installed into vehicle 10, housed or embedded in dashboard 12. In another embodiment, HUD 26 may be a separate component positionable on an upper surface of dashboard 12. For example, HUD 26 may be secured with a releasable adhesive, a suction cup, or the like. HUD 26 may be positioned substantially aligned with steering wheel 16 to allow the driver to see the data without having to redirect his/her sightline.

HUD 26 may be configured to project text, graphics, and/or images onto windshield 24 to provide the driver a vast amount of information pertaining to the driver and/or vehicle 10. HUD 26 may be configured to display speed limits and turn-by-turn directions to the driver. HUD 26 may also be configured to repeat data from at least one of instrument panel 14, user interface 36, and audio system 18. For example, HUD 26 may be configured to display the speed of vehicle 10 to the driver and/or other conditions of vehicle 10, such as battery level, fuel level, and water level. HUD 26 may also be configured to allow access to audio system 18 without the driver having to redirect his/or her vision. For example, HUD 26 may be configured to provide the driver with information, such as the current song title and radio station. HUD 26 may be controlled by operation of POI 34, as later discussed in more detail.

User interface 36 may be configured to receive input from the user and transmit media. User interface 36 may have a display including an LCD, an LED, a plasma display, or any other type of display. User interface 36 may provide a Graphical User Interface (GUI) presented on the display for user input and data display. User interface 36 may further include a touchscreen, a keyboard, a mouse, or a tracker ball to enable user input. User interface 36 may be configured to receive user-defined settings. For example, user interface 36 may be configured to receive an occupant profile or programming data, including desired configurations of POI 34. It is also contemplated that user interface 36 may be selectively disabled when vehicle 10 is in motion to reduce distraction for a driver. For example, the input function of user interface 36 may be disabled while the display function remains.

POI 34 may be positioned in a number of different locations of vehicle 10. For example, as depicted in FIG. 1, POI 34 may be positioned on a surface of center console 32 between driver seat 28 and passenger seat 30, facilitating access for occupants of each front seat 28, 30. However, POI 34 may also be positioned in other locations convenient to one or more occupants of front seats 28, 30, such as on a surface of dashboard 12 and/or on user interface 36. POI 34 may, additionally or alternatively, be positioned for access to occupants of back seats, such as on a center console between back seats. In some embodiments, POI 34 may be integrated into a surface of vehicle 10, as depicted in FIG. 1. In some embodiments, POI 34 may be releasably secured to a surface of vehicle 10 with an attachment mechanism such as a suction cup, a releasable adhesive, interlocking members, and/or a magnetic connection.

FIG. 2A is a diagrammatic illustration of an exemplary embodiment of POI 34 of exemplary vehicle 10 of FIG. 1. As illustrated in FIG. 2, POI 34 may include a housing 50 having a base portion 52 with a number of elongated members 54 extending therefrom. Base portion 52 may have a convex upper surface configured to accommodate a palm of an occupant while elongated members 54 may define one or more grooves 56 positioned therebetween. For example, housing 50 may include five elongated members 54 that define four grooves 56 therebetween, each groove 56 may be configured to receive a finger of an occupant. As further shown in FIGS. 2B and 2C, each groove 56 may have a substantially U-shaped cross-section to accommodate each finger and may include one or more input devices 100 to be actuated by fingers received in the groove.

Housing 50 may also include one or more side grooves 58, 60 positioned peripheral of base portion 52 and elongated members 52. For example, housing 50 may include a first side groove 58 positioned on a first side of housing 50 proximate to driver seat 28 and configured to accommodate a thumb of an occupant of driver seat 28. Housing 50 may also include a second side groove 60 positioned on a second side of housing 50 proximate to the passenger seat 30 and configured to accommodate a thumb of an occupant of passenger seat 30. Each side groove 58, 60 may also include one or more side input devices 102 to be actuated by thumbs of the occupants.

Housing 50 may further include a central groove 62 positioned substantially centered on base portion 52. Central groove 62 may have a circular shape with a concave depression (as depicted in FIG. 2B) to accommodate a central input device 104 that may be actuated by a palm, a thumb, or a finger of the occupant. It is contemplated that central groove 62 may be modified to accommodate different embodiments of central input device 104 or may be omitted.

Input devices 100, 102, and 104 and grooves 56, 58, 60, and 62 may at least partially define a plurality of active areas configured to receive, respectively, a plurality of digits of a user of vehicle 10 and generate a first signal based on a movement of at least one of the plurality of digits. Each of the active areas may be associated with a function of the vehicle to be controlled. Housing 50 may at least partially define one or more non-active areas disposed between the plurality of active areas and spatially separating the plurality of active areas. A controller may be configured to receive the first signal and generate a second signal for controlling the function associated with the respective active area.

Input devices 100, 102, and 104 may include a number of different structures configured to receive an input from the occupant and generate a signal. Input devices 100, 102, and 104 may include at least one of a touch-sensitive surface, a button, a slider, a scroll wheel, and a roller ball. For example, in some embodiments, input devices 100, 102, and 104 may include a touch-sensitive surface (e.g., a tracking pad or a touchscreen) having an array of conductors separated by an insulator, wherein a high frequency signal is applied sequentially between pairs of conductors in the array. A finger that contacts the tracking pad or touch screen may be detected and located due to a change in capacitance between the conductors. In some embodiments, input devices 100, 102, and 104 may include a button and/or a slider which may be depressed and/or translated, e.g., longitudinally along a slot (not shown). In some embodiments, input devices 100, 102, and 104 may include a scroll wheel which may be depressed and/or rotated in one-dimension, and/or a roller ball which may be depressed and/or rotated in two-dimensions. Even though FIGS. 2A-2C depict input devices 100 and 102 as touch-sensitive surfaces and central input device 104 as a roller ball, POI 34 may include any combination of embodiments of input devices 100, 102, and 104. It is also contemplated that input device 100, 102, and 104 may be of the same type or different types.

Input devices 100, 102, and 104 may also be configured to provide haptic and/or audible feedback based on the input and/or operation. In some embodiments, input devices 100, 102, and 104 may be operatively connected to a vibration motor having an off-axis weight that vibrates at least a portion of POI 34 based on certain inputs or operations. For example, vibration motor may provide a feedback when a user toggles through operations and/or when the user makes a selection. In some embodiments, input devices 100, 102, and 104 may include detents that allow the input devices 100, 102, and 104 to translate and/or rotate in discrete steps. For example, detents may be provided on a scroll wheel and configured to interact with another surface to generate a haptic feedback (e.g., bumps) and/or an audible feedback (e.g., clicks). In some embodiments, input devices 100, 102, and 104 may slide, rotate, deform, and/or depress when sufficient pressure is applied. For example, input devices 100, 102, and 104 may include a touch-sensitive surface which may be deformed or depressed based on a certain degree of pressure applied, indicating a certain input or operation.

Input devices 100, 102, and 104 may be further configured to receive biometric data. In some embodiments, input devices 100, 102, and 104 may include a scanner and/or a touch-sensitive surface which may be configured to detect a fingerprint of the occupant. For example, input devices 100, 102, and 104 may include a scanner that captures an image of a fingerprint and generates a signal based on the image, which may be processed by a controller. Similarly, a touch-sensitive surface may be configured to detect the ridges and furrows of a fingerprint based on a change in capacitance and generate a signal based on the detected fingerprint, which may be processed by a controller. The controller may be configured to compare the signal to stored data to determine whether the fingerprint matches recognized occupants. Input devices 100, 102, and 104 may be configured to include biometric data into a signal, such that a controller may be configured to identify the person who is generating the input. For example, in some embodiments, certain inputs (e.g., turning on vehicle 10) may only be available to certain individuals as identified by the biometric data.

Input devices 100, 102, and 104 may also be configured to measure parameters of the input and generate signals additionally based on the measured parameters of the input. In some embodiments, input devices 100, 102, and 104 may be configured to measure a pressure applied by an occupant and responsively generate a signal. For example, input devices 100, 102, and 104 may be configured to generate a first signal based on the occupant applying a first pressure (e.g., tapping), generate a second signal based on the occupant applying a second pressure (e.g., lightly pressing), and generate a third signal based on the occupant applying a third pressure (e.g., firmly pressing). In some embodiments, input devices 100, 102, and 104 may be configured to measure a speed of an input applied by an occupant and responsively generate a signal. In some embodiments, input devices 100, 102, and 104 may be configured to recognize gestures and responsively generate a signal. For example, input devices 100, 102, and 104 may be configured to recognize letters and/or other shapes that may be traced by the occupant onto the input devices 100, 102, and 104. Input devices 100, 102, and 104 may also be configured to receive other gestures, such as pinching fingers/thumb to zoom in or spreading fingers/thumb to zoom out. In some embodiments, input devices 100, 102, and 104 may be configured to determine sequential actuations and/or lengths of time of the actuations. For example, input devices 100, 102, and 104 may be configured to generate a first signal based on a single tap and a second signal based on a double tap.

Figure 3B:
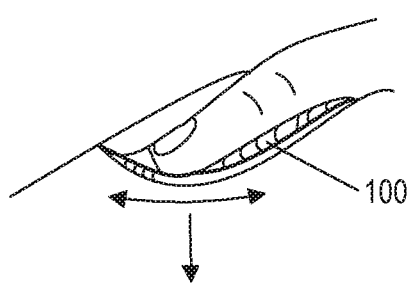

FIGS. 3A and 3B are other diagrammatic illustrations of an exemplary onboard interface as depicted in FIG. 2A. Element numbers of POI 34 in FIGS. 3A and 3B are consistent with FIGS. 2A-2C, so they are not represented in FIGS. 3A and 3B. As depicted in FIG. 3A, base portion 52 may be configured to receive a palm of the occupant, side groove 58 may be configured to receive a thumb, a first groove 56 may be configured to receive an index finger, a second groove 56 may be configured to receive a middle finger, a third groove 56 may be configured to receive a ring finger, and a fourth groove 56 may be configured to receive a pinky finger. Therefore, each of the palm, thumb, and fingers may independently or jointly provide an input to input device 100, 102, and 104.

For example, as depicted in FIGS. 3A and 3B, first input device 100 may be configured to control the operation of a phone of vehicle 10 or a phone connected to vehicle through Bluetooth™. For instance, as shown in FIG. 3B, the occupant may scroll through phone contacts by dragging the index finger up/down on input device 100, and/or navigate between screens by dragging the index finger left/right on input device 100. Similarly, the occupant may select a contact by tapping input device 100, conduct a call to the contact by firmly pressing input device 100, and/or initiate a text message to the contact by double tapping input device 100. Similar control may be performed on the navigation by the thumb, the channel of audio system 18 by the middle finger, the volume of audio system 18 by the ring finger, and the weather displayed on HUD 26 by the pinky finger.

In order to reduce inadvertent actuation, some operations may require actuation of two or more of input devices 100, 102, and 104, simultaneously or sequentially in a predetermined order. For example, as depicted in FIG. 3A, turning on vehicle 10 may require simultaneous actuation of the index finger and the middle finger. However, in another exemplary embodiment, vehicle 10 may be turned on following an input from the index finger, followed by the ring finger, followed by the middle finger. Other contemplated operations that may be controlled through input devices 100, 102, and 104 may include raising/lowering a window, adjusting interior lighting, adjusting the position of a seat, initiating an automatic parking feature, controlling heating and/or air conditioning settings, and/or accessing internet, weather, and traffic. The correlation of the specific operation to the input devices 100, 102, and 104 is not limiting and may be programmed based on the occupant's preferences.

Figure 4:
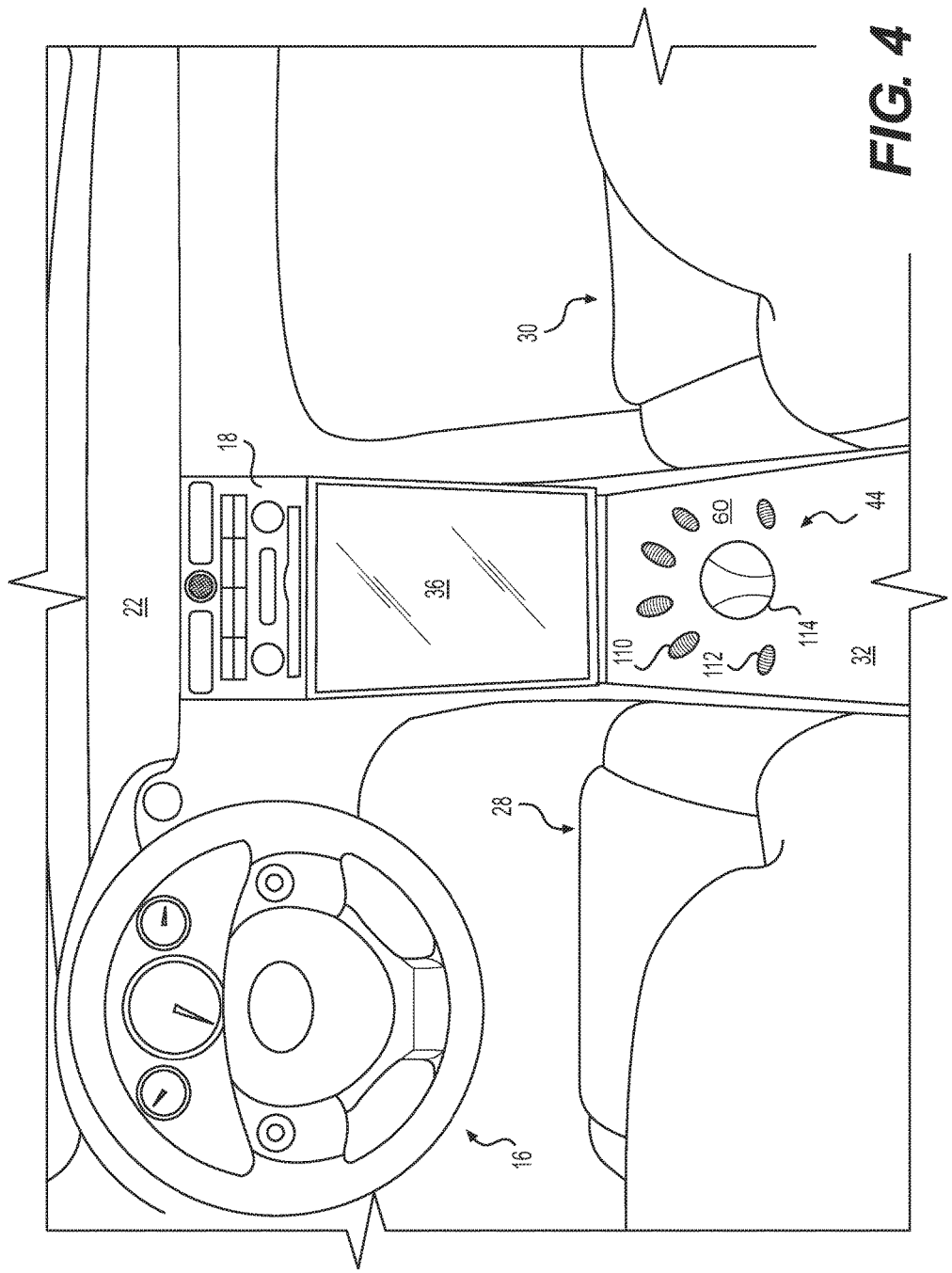
FIG. 4 is a diagrammatic illustration of an exemplary programmable onboard interface of the exemplary vehicle of FIG. 1, according to another exemplary embodiment of the disclosure.

FIG. 4 is a diagrammatic illustration of an exemplary programmable onboard interface (POI) 44 of the exemplary vehicle of FIG. 1, according to another exemplary embodiment. Element numbers of vehicle 10 are consistent with FIG. 1, so all element numbers of vehicle 10 are not represented in FIG. 4. As depicted in FIG. 4, POI 44 may include a plurality of input devices 110, 112, and 114 and a housing 60 incorporated into a surface of vehicle 10. For example, housing 60 may include a surface of center console 32 to accommodate the hand of an occupant in front seats 28, 30. POI 44 may include a plurality (e.g., four) input devices 110 spaced apart to each accommodate a finger of the occupant. Side input devices 112 may be spaced to receive a thumb of occupants of each of front seats 28, 30. Central input device 114 may be positioned to accommodate a palm of the hand of occupant when the fingers and thumbs are accommodated by input devices 110 and 112. Central input device 114 may also be actuated by fingers and thumbs when hand is removed from one or more of input devices 110 and 112. In some embodiments, input devices 110, 112, and 114 may be recessed in grooves of housing 60 that may receive a finger of the occupant. In some embodiments, input devices 110, 112, and 114 may be elevated above the surface of housing 60. It is also contemplated that POI 44 may include a sheet of glass defining an array of input devices 110, 112, and 114. Input devices 110, 112, and 114 may include similar structures and functions as input devices 100, 102, and 104, and POI 44 may provide similar control operations of vehicle 10 as POI 34, as discussed herein.

FIG. 5 is a diagrammatic illustration of an exemplary method of programming the exemplary onboard interface devices of FIG. 1, according to an exemplary embodiment of the disclosure. Element numbers of POI 34 in FIG. 5 are consistent with FIGS. 2A-2C, so they are not represented in FIG. 5. The exemplary method of programming may be performed through an onboard menu 1000, e.g., displayed on HUD 26, user interface 36, or a mobile communication device (e.g., a smart phone). The programming of POI 34 may apply to all occupants of vehicle 10 or may be individually programmed for each user. For example, a control system may be configured to recognize the identity of the occupant through a manual selection and/or biometric data received through POI 34. The control system may then be configured to program input devices 100, 102, 104 based on preferences of the occupant. For example, a user may be able to select one or more categories of operation from menu field 1004 to be assigned to each of the input devices 100, 102 and 104 as depicted in graphical interface 1002. Exemplary categories of operation may include at least one of controlling navigation, increasing/decreasing a volume of audio system 18, manipulating a channel of audio system 18, controlling a phone, raising/lowering a window, adjusting a seat, and/or accessing internet, weather, and traffic. The user may be able to toggle through the input devices 100, 102, and 104 and categories of menu field 1004 and make a selection for each of input devices 100, 102, and 104. It is also contemplated that the method of programming may be performed through voice commands received via microphone 20 or remotely through a mobile communication device.

The selected category of operations may be correlated to input devices 100, 102, and 104 in a look-up chart and saved in memory of a controller. For example, when the user actuates one or more of input devices 100, 102, and 104, the controller may recall the data of the look-up chart and actuate the corresponding operation, as later discussed.

The method of programming and the availability of operations may depend on a number of parameters. For example, the method and availability may depend on whether the user is occupying either driver seat 28 or passenger seat 30. For example, if it is determined that the user is occupying driver seat 28, the control system may disable the programmable option while vehicle 10 is turned on and/or in motion to reduce distraction. The control system may also be configured to provide more limited operations for drivers. For example, drivers may not be allowed to access the internet or perform operations through user interface 36 while operating vehicle 10. However, if determined that the user is a passenger, the user may be provided full operation of POI 34. Similarly, POI 34 may also be configured to be programmed to include a first set of operating parameters for an occupant when the occupant is detected to be occupying driver seat 28, and a second set of operating parameters for the same occupant when the occupant is detected to be occupying passenger seat 30. The method of programming and the availability of categories may also depend on the user. In some embodiments, the control system may allow a parent to limit the operations available for his/her child(ren). For example, the control system may prevent the child(ren) from accessing a phone or the internet when in vehicle 10 or when occupying driver seat 28.

FIG. 6 is a block diagram of an exemplary embodiment of a control system 11 that may be used with the exemplary vehicle of FIGS. 1-5. All element numbers of POI 34 in FIG. 6 are consistent with FIGS. 2A-2C, so they are not represented in FIG. 6. As illustrated in FIG. 6, control system 11 may include a controller 200 having, among other things, an I/O interface 202, a processing unit 204, a storage unit 206, and a memory module 208. One or more of the components of controller 200 may be installed in an onboard computer of vehicle 10. These components may be configured to transfer data and send or receive instructions between or among each other.

I/O interface 202 may also be configured for two-way communication between controller 200 and various components of control system 11. For example, as depicted in FIG. 6, I/O interface 202 may send and receive operating signals to and from audio system 18, HUD 26, and user interface 36. I/O interface 202 may send and receive the data between each of the components via communication cables, wireless networks, or other communication mediums.

Processing unit 204 may be configured to receive signals from components of control system 11 and process the signals to determine a plurality of conditions of the operation of vehicle 10. Processing unit 204 may also be configured to generate and transmit command signals, via I/O interface 202, in order to actuate the components of control system 11.

One or more components of control system 11 may be configured to determine the identity of a user of POI 34. In some embodiments, processing unit 204 may be configured to receive a signal from input devices 100, 102, and 104 indicative of biometric data (e.g., a fingerprint). Processing unit 204 may then be configured to compare the received signal to data stored in storage unit 206 and/or memory module 208 to determine whether the received biometric data sufficiently matches the stored biometric data of identified occupants. In some embodiments, processing unit 204 may be configured to determine identity by receiving a signal from microphone 20 and executing voice recognition software. In some embodiments, processing unit 204 may, additionally or alternatively, be configured to determine the identity of a user through a manual selection displayed on one of HUD 26 and/or user interface 36. In some embodiments, certain operations of control system 11 may only be enabled for certain people. For example, control system 11 may be configured to start vehicle 10 only upon detection of biometrics (e.g., a fingerprint) of the owner. However, control system 11 may be programmed to enable other individuals to operate vehicle 10. Control system 11 may also be configured to determine the location of individual components of the hand of an occupant, e.g., through a palm print and fingerprints of each finger and thumb.

One or more components of control system 11 may be configured to determine whether a user is a driver or a passenger of vehicle 10. In some embodiments, the determination of whether the user is occupying driver seat 28 or passenger seat 30 may be made according to whether POI 34 receives a left hand or a right hand. For example, control system 11 may be configured to detect the relative placement of the thumb and/or fingers of the user. For instance, control system 11 may be configured to determine which side groove 58, 60 is receiving a thumb of the occupant. If side input device 102 positioned on the side of a driver detects a thumb, control system 11 may determine that the user is a driver of vehicle 10. However, if side input device 102 on the side of passenger seat 30 detects a thumb, control system 11 may determine that the user is a passenger of vehicle 10. The determination may also be based on the relative location of other fingers, such as whether the index finger is to the left or right of the middle finger. In some embodiments, this determination, may additionally or alternatively, be based on sensors (e.g., weight sensors) of vehicle 10 configured to determine the presence of occupants in each seat 28, 30. After determining that the user of POI 34 is the driver of vehicle 10, control system 11 may be configured to enable HUD 26 and disable user interface 36. Control system 11 may also disable certain operations to reduce distractions to the driver. On the other hand, control system 11 may enable full operation of user interface 36 and/or POI 34 when control system 11 determines that the user is occupying passenger seat 30.

One or more components of control system 11 may provide control of a plurality of operations through POI 34. Control system 11 may be configured to control operation of at least one of audio system 18, HUD 26, and user interface 36 through actuation of at least one of input devices 100, 102, and 104. In some embodiments, for example, processing unit 204 may be configured to increase/decrease an audio output of audio system 18 according to a first operation of POI 34 (e.g., dragging a finger up/down on input device 100, 102, and/or 104), toggle through audio inputs (e.g., songs) according to a second operation of POI 34 (e.g., dragging a finger left/right on input device 100, 102, and/or 104), and play/stop an audio input according to a third operation of POI 34 (e.g., pressing input device 100, 102, and/or 104). In some embodiments, for example, processing unit 204 may be configured to initiate navigation according to a first operation (pressing down two or more input devices 100, 102, and/or 104), toggle through destinations by a second operation (e.g., dragging a finger up/down input device 100, 102, and/or 104), toggle through routes to the destination according to a third operation (e.g., dragging a finger left/right on input device 100, 102, and/or 104), and select a route to a destination by a fourth operation (e.g., pressing input device 100, 102, and/or 104). Control system 11 may also be configured to control operation of a motor or a transmission of vehicle 10. For example, control system 11 may be configured to turn on vehicle 10 or initiate an automatic parking feature of vehicle 10.

One or more components of control system 11 may be configured to provide a feedback to the user based on actuation of input devices 100, 102, and/or 104. In some embodiments, processing unit 204 may be configured to provide the feedback in the form of a tactile or audible output to POI 34. For example, processing unit 204 may be configured to actuate a vibration motor to generate vibrations in at least a portion of POI 34. In some embodiments, processing unit 204 may be configured to initiate a verbal feedback to the user through speaker 22. For example, processing unit 204 may be configured to initiate verbal prompts through speaker 22 such as "YOU ARE STARTING THE VEHICLE." In some embodiments, the prompt may be in the form of a question, such as "DO YOU WANT TO START THE VEHICLE?" necessitating an input from the user to confirm the selection. Control system 11 may have a number of different available configurations with varying degrees of features. For example, control system 11 may have a learning mode with verbal prompts and a normal mode without verbal prompts.

One or more components of control system 11 may be configured to program POI 34 based on instruction received onboard. For example, processing unit 204 may be configured to receive a user instruction to associate input devices 100, 102, and/or 104 with one of a plurality of categories of operations.

Storage unit 206 and/or memory module 208 may include any appropriate type of mass storage provided to store any type of information that processing unit 204 may use to operate. For example, storage unit 206 may include one or more hard disk devices, optical disk devices, or other storage devices to provide storage space. Memory module 208 may include one or more memory devices including, but not limited to, a ROM, a flash memory, a dynamic RAM, and a static RAM.

Storage unit 206 and/or memory module 208 may be configured to store one or more computer programs that may be executed by controller 200 to perform functions of control system 11. For example, storage unit 206 and/or memory module 208 may be configured to store biometric software configured to determine the identity of individuals based on a fingerprint and/or voice recognition. Storage unit 206 and/or memory module 208 may also be configured to store software to recognize inputs based in interaction with touch-sensitive surfaces. Storage unit 206 and/or memory module 208 may be further configured to store data and/or look-up tables used by processing unit 204. For example, storage unit 206 and/or memory module 208 may be configured to include data pertaining to profiles of occupants of the vehicle. Storage unit 206 and/or memory module 208 may also be configured to store look-up charts correlating categories of operations to actuation of input devices 100, 102, and/or 104.

Another aspect of the disclosure is directed to a non-transitory computer-readable medium storing instructions which, when executed, cause one or more processors to perform the method of controlling an operation of a vehicle, as discussed above. The computer-readable medium may include volatile or non-volatile, magnetic, semiconductor, tape, optical, removable, non-removable, or other types of computer-readable medium or computer-readable storage devices. For example, the computer-readable medium may be storage unit 206 or memory module 208 having the computer instructions stored thereon, as disclosed in connection with FIG. 6. In some embodiments, the computer-readable medium may be a disc or a flash drive having the computer instructions stored thereon.

It will be apparent to those skilled in the art that various modifications and variations may be made to the disclosed onboard user interface. Other embodiments will be apparent to those skilled in the art from consideration of the specification and practice of the disclosed onboard user interface. It is intended that the specification and examples be considered as exemplary only, with a true scope being indicated by the following claims and their equivalents.

What is claimed is:

1. A vehicle comprising:
   a first seat configured to accommodate a first occupant;
   a second seat configured to accommodate a second occupant, the second seat positioned adjacent to the first seat; and
   an onboard interface device adjacent to the first seat, the onboard interface device comprising:
      a housing configured to accommodate either a palm of the first occupant or a palm of the second occupant;
      a first groove positioned in the housing and configured to accommodate either a first finger of the first occupant or a finger of the second occupant; and
      a first input device positioned in the first groove, and configured to:
         be actuated by either the first finger of the first occupant or the finger of the second occupant,
         in the event that the first input device is actuated by the first finger of the first occupant, generate a first signal for controlling a first operation of the vehicle, and
         in the event that the first input device is actuated by the finger of the second occupant, generate a second signal, different from the first signal, for controlling a second operation of the vehicle different from the first operation of the vehicle.

2. The vehicle of claim 1, further comprising:
   a center console positioned between the first seat and the second seat,
   wherein the onboard interface device is positioned on the center console.

3. The vehicle of claim 1, wherein the onboard interface device further comprises:
   a second groove positioned in the housing; and
   a second input device positioned in the second groove, configured to be actuated by a second finger and generate a third signal, different from the first and second signals for controlling a third operation of the vehicle different from the first and second operations of the vehicle.

4. The vehicle of claim 1, wherein the onboard interface device further includes a central input device substantially centered on the housing, wherein the central input device is configured to generate a third signal different from the first and second signal for controlling a third operation of the vehicle different from the first and second operation of the vehicle.

5. The vehicle of claim 1, wherein the first input device includes at least one of a touch-sensitive surface, a button, a slider, a roller ball, and a scroll wheel.

6. The vehicle of claim 1, wherein the first input device is configured to receive biometric data, the first signal being generated at least partially based on the biometric data.

7. The vehicle of claim 1, further including a motor, and wherein the first signal generated by the first input device is configured to control an operation of the motor.

8. The vehicle of claim 1, further including a user interface having a display, and wherein the first signal generated by the first input device is configured to control the display.

9. The vehicle of claim 1, wherein the onboard interface device is configured to receive a user instruction for programming the onboard interface device, wherein the user instruction associates the first input device with a category of operations of the vehicle, the category of operations including the first operation.

10. The vehicle of claim 9, wherein the category of operations is associated with at least one of weather, navigation, a phone, and an audio system.

11. A control system for a vehicle, comprising:
   an onboard interface device comprising:
      a housing configured to accommodate a palm of either a first occupant or a second occupant;
      a first groove positioned in the housing and configured to accommodate either a first finger of the first occupant or a first finger of the second occupant; and
      a first input device positioned in the first groove and configured to:
         generate a first signal upon receiving a user input from the first occupant, and
         generate a second signal different from the first signal upon receiving a user input from the second occupant; and
      a controller configured to:
         receive the first signal from the onboard interface device and control a first operation of the vehicle upon receiving the first signal, and
         receive the second signal from the onboard interface and control a second operation of the vehicle different from the first operation of the vehicle upon receiving the second signal.

12. The control system of claim 11, wherein the onboard interface device further includes:
   a second groove extending from the onboard interface device; and
   a second input device positioned in the second groove and configured to generate a third signal different from the first and second signals.

13. The control system of claim 11,
   wherein the first input device is configured to receive biometric data, the first signal being at least partially based on the biometric data, and
   wherein the first operation of the vehicle is based on the biometric data.

14. The control system of claim 11, further including at least one of a motor and a display, and wherein the first signal generated by the first input device is configured to control operation of at least one of the motor and the display.

15. The control system of claim 11, wherein the onboard interface device is configured to receive a user instruction for programming the onboard interface device, wherein the user instruction associates a category of operations of the vehicle with the first input device, the category of operations including the first operation.

16. The control system of claim 15, wherein the category of operations is associated with at least one of weather, navigation, a phone, and an audio system.

17. An onboard interface device for a vehicle, the onboard interface device comprising:
- a housing configured to accommodate a palm of an occupant;
- a first groove positioned in the housing and configured to accommodate a first finger of the occupant; and
- a first input device positioned in the first groove and configured to generate a first signal upon an input of the first finger for determining an identity of the occupant, and generate a second signal different from the first signal, the second signal for controlling a first operation of the vehicle,
- wherein the first operation of the vehicle is determined based on the determined identity of the occupant.

18. The onboard interface device of claim 17, further comprising:
- a second groove extending from the onboard interface device; and
- a second input device positioned in the second groove and configured to generate a third signal different from the first and second signal.

19. The onboard interface device of claim 17, wherein the first input device is configured to receive a user instruction for programming the onboard interface device, wherein the user instruction associates a category of operations of the vehicle with the first input device, the category of operations including the first operation.

* * * * *